INVENTOR.
DANIEL E. HERZIG
BY Merchant & Gould
ATTORNEYS

United States Patent Office 3,429,535
Patented Feb. 25, 1969

3,429,535
CONDUIT HOLDING DEVICE
Daniel E. Herzig, Burlington, N. Dak. 58722
Filed Mar. 29, 1967, Ser. No. 626,768
U.S. Cl. 248—58                    1 Claim
Int. Cl. F16l *3/00;* E21f *17/02;* B05b *15/06*

ABSTRACT OF THE DISCLOSURE

A conduit holding device including a frame having a plurality of outwardly extending hook-shaped members fixedly attached thereto for receiving the conduit fixedly therebetween. The frame is adapted to be mounted to an external member so that at least two surfaces of the frame are exposed, and one or more conduits can be held simultaneously.

BACKGROUND OF THE INVENTION

*Field of the invention*

Conduit holding devices of the present type are utilized to hold various conduits, such as hoses and the like, during storage, transporting, and/or special uses as well as many other tasks. The conduit holder may also be utilized to hold hydraulic and other types of hoses used in connection with operating equipment, such as tractors, farm machinery, etc.

*Description of the prior art*

In prior art devices, conduits either are held by permanently affixing them in position with any of a variety of clamps, which clamps are generally bolted or screwed in position, or by utilizing relatively complicated holders which have a large variety of parts and are costly to manufacture. In general, these prior art devices are also complicated and time consuming to use.

SUMMARY OF THE INVENTION

The present invention pertains to a conduit holding device and more particularly to a device for holding conduit in an operative position without hampering the operation thereof.

The present conduit holding device includes a frame mounted to an external member so that at least one surface is exposed, and having a plurality of hook-shaped members fixedly attached to the exposed surface in a manner to form a channel in which the conduit is received and held fixedly in position.

It is an object of the present invention to provide a new and improved conduit holding device.

It is a further object of the present invention to provide a conduit holding device which is extremely simple to construct and use.

It is a further object of the present invention to provide a conduit holding device which is inexpensive to manufacture.

It is a further object of the present invention to provide a conduit holding device, one of which can hold one or more conduits simultaneously.

It is a further object of the present invention to provide a conduit holding device which is capable of holding a flexible conduit in an operative position without hampering the operation thereof.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
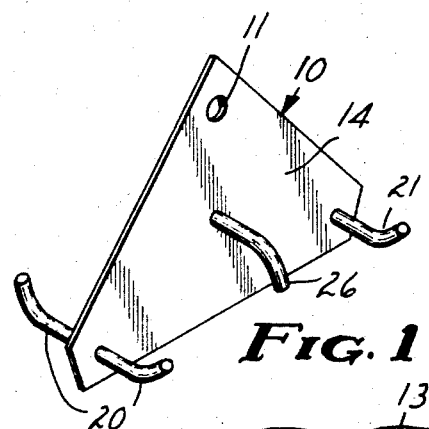
FIGURE 1 is a view in perspective of the conduit holding device.
Figure 4:
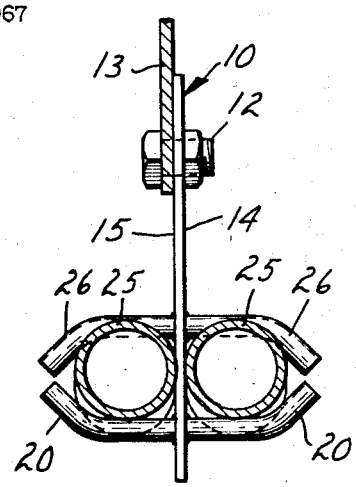
FIGURE 4 is a sectional view as seen from the line 4—4 in FIGURE 2.
Figure 2:
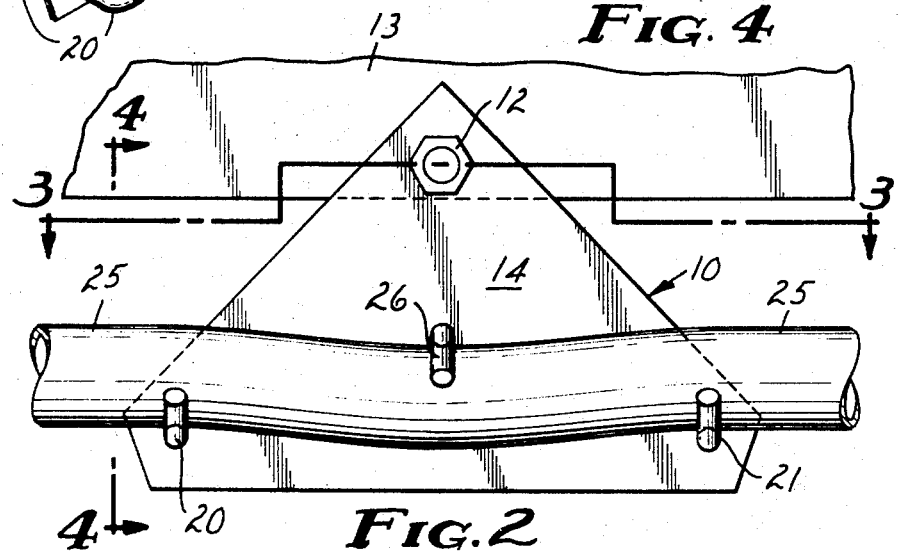
FIGURE 2 is an enlarged side view of the device illustrated in FIGURE 1 connected to an external member and having a conduit fixedly engaged therein.
Figure 3:
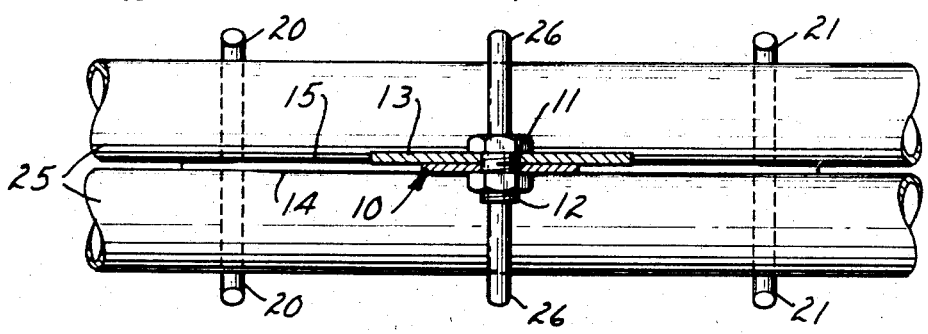
FIGURE 3 is a sectional view as seen from the line 3—3 in FIGURE 2.

Referring to the drawings, the numeral 10 generally designates a frame constructed from a flat plate of metal and having a generally triangular shape. The lower angles of the triangle are truncated, thereby producing a five edged shape to remove the sharp corners and reduce the possibility of damaging a conduit thereon. A hole 11 is provided adjacent the upper angle or apex of the triangular frame 10 for mounting the frame. In the general usage, the frame 10 will be mounted, as illustrated in FIGURES 2 through 4, by engaging a bolt 12 through the hole 11 and through a similar hole in an external member 13. By mounting the frame 10 in this manner, two sides 14 and 15 are exposed. It should be understood that the present configuration of the frame 10 is the preferred embodiment, but any configuration might be utilized which will perform the function of the present invention, and all of these configurations would come within the scope of this invention. Also, a variety of mounting means might be utilized to conform with the various configurations or the particular external member to which the frame is being mounted, and all such mounting means would be within the scope of this invention.

A pair of holes are formed in the frame 10 adjacent the lower edge thereof, and spaced apart so that one is adjacent each of the truncated portions of the frame 10. A generally U-shaped member 20 and 21, constructed from rod-like material, is inserted through each of the holes so that an approximately equal portion thereof extends outwardly from each of the sides 14 and 15 of the frame 10. The U-shaped members 20 and 21 are held fixedly in place by welding or the like. A third hole is formed through the frame 10 intermediate the first pair of openings, but spaced from a plane through the first pair of openings and perpendicular to the sides 14 and 15 of the frame 10 a distance approximately equal to the outer diameter of a conduit 25 which is to be held by the conduit holding device. A third U-shaped member 26, similar to the U-shaped members 20 and 21, is placed in the third hole and held fixedly in place by welding or the like. In this embodiment, the three U-shaped members, 20, 21, and 26 are mounted so that the extended ends of the two U-shaped members 20 and 21 bend upwardly and the extended ends of the U-shaped member 26 bend downwardly. Therefore, the ends of the U-shaped members 20, 21, and 26 converge toward a plane perpendicular to the sides 14 and 15 of the frame 10, and positioned generally parallel with and passing through the conduit 25 to be held by the conduit holding device.

It is of course well understood that those skilled in the art could provide a variety of shapes and forms in place of the U-shaped members 20, 21, and 26. Also, these members can be connected to the frame 10 in a variety of ways, including welding the members to either of the sides 14 and 15 in an outwardly extending configuration rather than extending the members through the frame 10 as in the present embodiment. The ends of the members 20, 21, and 26 extending from either side 14 and 15 of the frame 10 are hook-shaped to partially encircle the conduit 25, and it should be understood that the term hook-shaped as used in this specification is defined as any member which performs the functions of the members 20, 21, and 26.

In the operation of the present device, the conduit 25, which is a flexible conduit, is bent slightly so that it can be positioned over the members 20 and 21 and under the member 26. After positioning the conduit 25 correctly between the members 20, 21, and 26, it is allowed to resume its normal shape. However, in the present embodiment the member 26 is spaced slightly less than the outer diameter of the conduit 25 from the plane through the members 20 and 21 so that the conduit 25 is retained in a slightly bent position, as illustrated in FIGURE 2. By retaining the conduit 25 in a slightly bent position, the conduit holding device has a tendency to retard, and in some cases even prevent, axial movement of the conduit 25. In the event that a nonflexible conduit 25 is to be held by the conduit holding device, the member 26 must be spaced at least a distance equal to the outer diameter of the nonflexible conduit from the plane through the members 20 and 21.

Thus, a conduit holding device has been described which is extremely simple and inexpensive to manufacture, and is simple to mount and utilize. Further, the conduit holding device can be utilized to hold flexible conduit during operation and will not impair the operation thereof. In addition to the above advantages, the present conduit holding device can be utilized to hold one or more conduits simultaneously, and thus, reduce the number of conduit holding devices required and the problems created through the requirement for a number of conduit holding devices.

While I have shown and described a specific embodiment of this invention, further modifications and improvements will occur to those skilled in the art. I desire it to be understood, that this invention is not limited to the particular form shown, and I intend in the appended claim to cover all modifications which do not depart from the spirit and scope of this invention.

I claim:
1. A conduit holding device comprising:
   (a) a generally flat plate having means adjacent one edge thereof for connecting said plate to an external member;
   (b) a pair of spaced apart openings formed in said plate;
   (c) a third opening formed in said plate and spaced from a plane extending through said pair of openings perpendicular to said plate a distance approximately equal to the outside diameter of the conduit to be held;
   (d) three generally U-shaped members each being fixedly engaged in a separate one of said openings so as to extend outwardly from either side of said plate; and
   (e) said U-shaped members being further positioned so the outer ends thereof converge at either side of said plate toward a plane approximately perpendicular to said plate and passing therethrough between said pair of openings and said third opening.

References Cited
UNITED STATES PATENTS

| | | | |
|---|---|---|---|
| 1,450,640 | 4/1933 | Norman | 248—59 |
| 2,687,329 | 8/1954 | Hunter | 248—75 X |
| 3,334,852 | 8/1967 | Sumida | 248—83 |
| 3,363,048 | 1/1968 | Vaughn | 248—49 X |

CHANCELLOR E. HARRIS, *Primary Examiner.*

U.S. Cl. X.R.

248—75